United States Patent
Pecen et al.

(10) Patent No.: US 7,773,996 B2
(45) Date of Patent: Aug. 10, 2010

(54) APPARATUS AND METHOD FOR SIGNALING COMMUNICATION RESOURCE ALLOCATION ON A BLOCK BASIS

(75) Inventors: Mark Pecen, Waterloo (CA); Mihal Lazaridis, Waterloo (CA); Sean Simmons, Waterloo (CA)

(73) Assignee: Research In Motion Limited, Waterloo (CA)

( * ) Notice: Subject to any disclaimer, the term of this patent is extended or adjusted under 35 U.S.C. 154(b) by 355 days.

(21) Appl. No.: 11/272,433

(22) Filed: Nov. 10, 2005

(65) Prior Publication Data

US 2007/0104136 A1    May 10, 2007

(51) Int. Cl.
*H04W 72/00* (2009.01)
*H04W 4/00* (2009.01)
(52) U.S. Cl. ........................................ 455/450; 370/329
(58) Field of Classification Search ........................ None
See application file for complete search history.

(56) References Cited

U.S. PATENT DOCUMENTS

| | | | |
|---|---|---|---|
| 5,956,642 A | 9/1999 | Larsson | |
| 6,359,898 B1 * | 3/2002 | Cudak et al. | 370/442 |
| 6,563,806 B1 | 5/2003 | Yano | |
| 6,778,509 B1 * | 8/2004 | Ravishankar et al. | 370/322 |
| 6,895,248 B1 * | 5/2005 | Akyol et al. | 455/452.1 |
| 2002/0001314 A1 * | 1/2002 | Yi et al. | 370/469 |
| 2006/0039274 A1 * | 2/2006 | Park et al. | 370/208 |

FOREIGN PATENT DOCUMENTS

WO    WO 02/17668    2/2002

* cited by examiner

*Primary Examiner*—Nick Corsaro
*Assistant Examiner*—Joel Ajayi

(57) ABSTRACT

Apparatus, and an associated method, for providing notification of communication resource allocation to perform an EDGE-based, or other, data radio communication service. A matrix representer forms a matrix representation of communication resource allocations made across a plurality of radio carriers. A bit map constructor constructs a bit map of the matrix representation. And, an RLC header is formed that includes a header extension that is populated with the assignment bit map.

20 Claims, 3 Drawing Sheets

APPARATUS AND METHOD FOR SIGNALING COMMUNICATION RESOURCE ALLOCATION ON A BLOCK BASIS

The present invention relates generally to the communication of data pursuant to a high-speed data radio communication service, such as an Enhanced Data for GSM Evolution (EDGE) communication service. More particularly, the present invention relates to apparatus, and an associated method, by which to identify allocation of communication resources in an extension to a header part of an RLC (Radio Link Control) data block generated pursuant to communication operations.

BACKGROUND OF THE INVENTION

Performance of a data communication system is sometimes defined in terms of its throughput capability, in part due to the significance of data throughput rates to performance of many data communication services. High-speed data communication services, historically, were performed by way of wireline communication systems. However, the rapid rate at which communication technologies have evolved has also permitted the development and deployment of radio communication systems capable of communicating data at high throughput rates. Data services that necessitate for their execution the communication of large amounts of data in short periods of time are increasingly able to be performed by way of a radio communication system that is capable of communicating the data at the high throughput rates. With further evolution of communication technologies, the need for the capability to communicate data at yet higher data throughput rates by way of radio communication systems shall likely become possible and communication services necessitating data to be communicated at such higher data throughput rates shall correspondingly become available.

Various cellular communication systems, constructed in conformity with various operating specifications, are exemplary of radio communication systems that are capable of communicating data at high data throughput rates. For instance, GSM (Global System for Mobile communications) cellular communication systems have been developed and widely deployed. Many GSM networks provide for GPRS (General Packet Radio Service) that permits communication of data at relatively high data rates. An extension to GPRS, referred to as EDGE (Enhanced Data for GSM Evolution), is presently undergoing deployment. EDGE-capable communication systems provide for communication of data at data throughput rates that are significantly higher than those achievable in GSM/GPRS-only communication systems. In spite of the improved communication capabilities of an EDGE-capable system, there is a continuing need yet further to increase the achievable data throughput rates by which data is communicated in a radio communication system.

An EDGE-capable communication system is operated in general conformity with an operating specification promulgated by a standards-setting body. The operating specification defines, amongst other things, a channel structure that defines channels on a radio air interface formed between communication stations operable in the communication system. Multiple carriers are available for use, defined sometimes logically in terms of mobile index allocation offsets. The channel structure includes frames, each of which is divided into time slots. Data, at a Radio Link Control (RLC) layer, is typically communicated as a series data RLC data blocks, each RLC data block including a header part and a payload part. Due to various requirements, even though frames and time slots are defined upon each of the multiple carriers that are available for use to communicate blocks of data, communication resources that are allocated for the communication of data pursuant to a particular communication session are allocated upon a single carrier. Communication resources, to date, are not allocated upon multiple carriers or, more generally, across a plurality of mobile allocation index offsets. Because, conventionally, communication resource allocations are made upon only a single radio carrier or mobile allocation index offset, there presently is no mechanism by which to identify communication resources across a plurality of radio carriers or index offsets.

It is in light of this background information that the significant improvements of the present invention have evolved.

DETAILED DESCRIPTION

Figure 1:
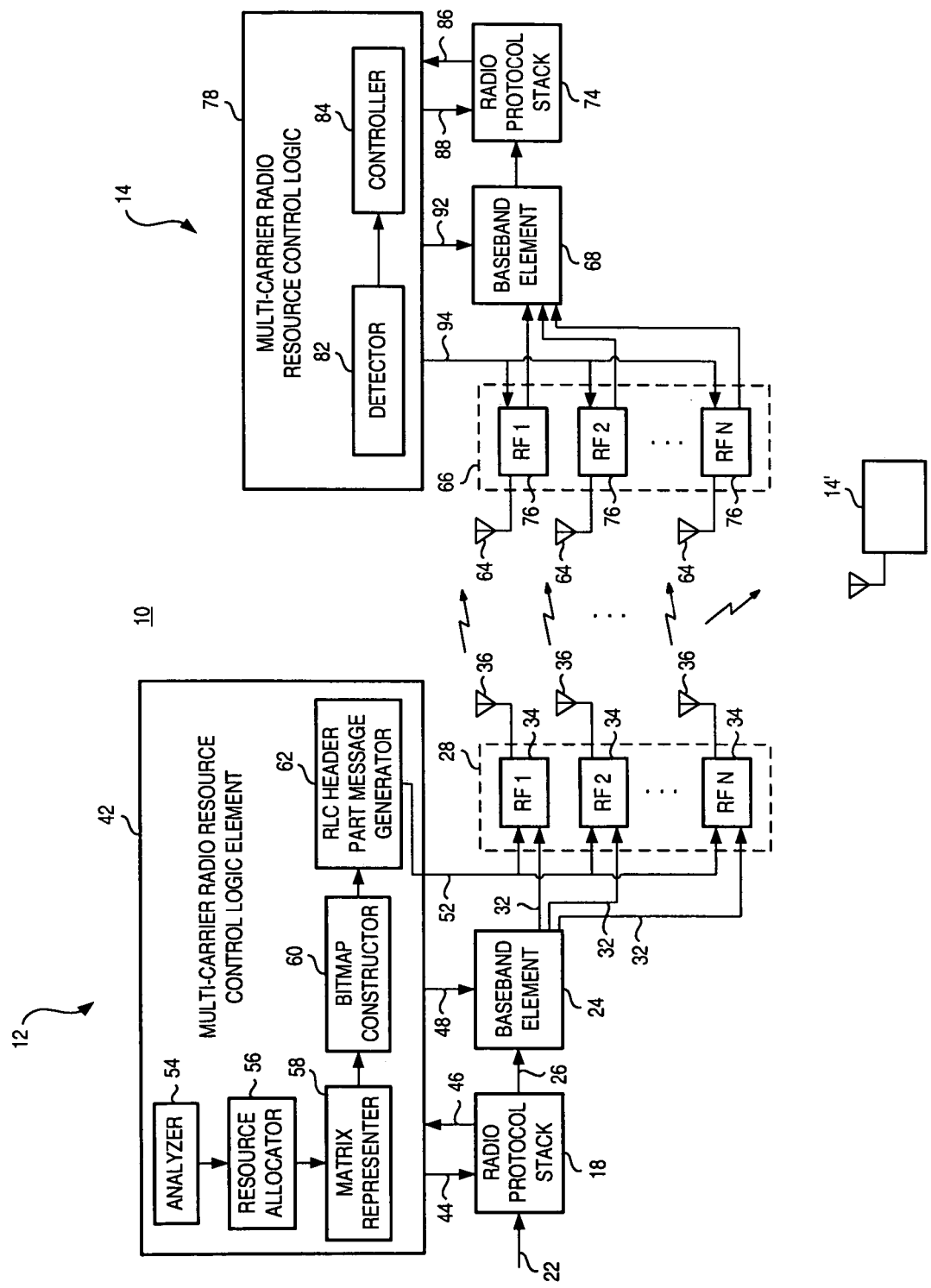
FIG. 1 illustrates a functional block diagram of an exemplary communication system that includes an embodiment of the present invention as a portion thereof.

The present invention, accordingly, advantageously provides apparatus and method for use in communication of high-speed data to perform a high-speed data radio communication service, such as EDGE (Enhanced Data for GSM Evolution) data communicated in an EDGE-capable communication system to perform a data communication service.

Through operation of an embodiment of the present invention, the header part of an RLC (Radio Link Control) data block is selectably populated with values that provide notification of communication resources allocated pursuant to the communication of data, such as pursuant to the communication of EDGE data communicated to perform an EDGE communication service.

The communication resources are allocated across a plurality of radio carriers, and an assignment bit map is formed that is of values that correspond to, or are otherwise representative of, a matrix representation of the communication resource allocation. By allocating the communication resources across a plurality of radio carriers, the likelihood of resource availability during any particular time slot is greater than the likelihood of a corresponding level of resources being available at a single carrier. The communication resource allocation is made of time slot allocations on different ones of the radio carriers, and the matrix representation is formed of matrix elements positioned in rows and columns, each matrix element identifying, for a single time slot and carrier or index offset combination, whether resources are allocated. The values of each matrix element of the matrix representation is used to form a bit map that populates a field of the temporary flow set identifier.

The bit map populates a header extension field of an RLC block that is communicated between communication stations that are to be parties to a communication session pursuant to which data is communicated. The RLC block, including the populated header extension field, is formed at, or provided to, a first communication station and is communicated to a second communication station to notify the second communication station of the communication resource allocation. The assignment bit map contained in the header extension field is based upon a matrix representation that is, alternately, a straightforward mapping of the time slot allocations within a time frame across each of the plurality of radio carriers or a resultant matrix, formed by performing matrix manipulations to reduce the size of the matrix representation.

In one aspect of the present invention, a bit map constructor is provided that, responsive to an indication of a matrix representation of the communication resource allocation, forms a first assignment bit map. The matrix representation is formed of a direct mapping, or a matrix manipulation of the direct mapping, of the communication resource allocation across the plurality of carriers during a frame, or other appropriate period. And the assignment bit map is of values corresponding to the matrix representation.

In another aspect of the present invention, a message generator receives the assignment bit map representative of the communication resource allocation and selectably includes the values of the bit map that is generated by the bit map constructor. Values of the bit map populate an extension field of the header part of an RLC block. By populating the field of the RLC block with such values, the header part of the RLC block forms a notification message that is capable of providing notification of the communication resource allocation made to communicate data.

In another aspect of the present invention, the resource allocations are dynamically made at selected intervals. Successive RLC blocks have header extensions populated with updated assignment bit maps that form reallocation messages that reallocate earlier allocations of communication resources. When the bit map constructor receives an updated, or other subsequent, indication of resource allocation, the bit map constructor forms an updated bit map construction representative of the communication resource allocation and provides the updated bit map construction, or indications of changes to a prior bit map construction, to the message generator. The message generator uses the updated information provided thereto to populate the extension field of a new RLC block. The extension field of the RLC block forms a notification message that provides notification of reallocation of the communication resources.

In another aspect of the present invention, the RLC datablock, containing the header extension populated with the assignment bit map, once generated, is communicated, by way of a radio air interface, from a first communication station to a second communication station. The second communication station, a receiving station, includes a detector that detects the contents of the header part of the received block and the values of the assignment bit map contained therein and representative of the communication resource allocation. Values of the bit map are extracted and provided to a controller. The controller controls operation of the receiving station so that the receiving station is operable to receive data subsequently communicated using the communication resources allocated for the communication of the data.

The message generated by the message generator selectably includes further information, such as information identifying a starting period at which the allocated communication resources shall be available for the communication of the data. The indication is, alternately, an absolute indication or an implicit indication. Or, the resource allocation is defined to pertain to a selected number, e.g., four, blocks of subsequently communicated data. Alternately, the duration period is, e.g., time-based, represented in terms of a frame duration length.

In one implementation, the resource allocation is made at a network part of an EDGE-capable radio data communication system for the communication of EDGE data by the network part to a mobile station or, in a multicast, to a group of mobile stations. The communication resources are allocated across a plurality of radio carriers, identified, e.g., in terms of mobile allocation index offsets (MAIOs).

By forming a header extension that includes a bit map representative of the communication resource allocation across the plurality of radio carriers, a notification of the resource allocation is readily provided to a remote communication station that is to be party to a communication session during which data is to be communicated merely by sending the RLC block containing the header extension to the remote station.

In these and other aspects, therefore, apparatus and associated methodology is provided for providing notification of a communication resource allocation allocable across a group of radio carriers. A bit map constructor is adapted at least to receive an indication of the communication resource allocation made for the communication of the data. The bit map constructor is configured to construct a first assignment bit map of the communication resource allocation. The communication resource allocation is made responsive to a matrix representation of the resource allocation. A message and generator is adapted to receive the bit map made by the bit map constructor. The generator is configured to generate a message that includes a first portion including an indication of whether the message includes a communication resource allocation and selectably a second portion including the first assignment bit map. The message is for communication to provide the notification of the communication resource allocation pursuant to the communication of the data.

In these and other aspects, further apparatus and methodology is provided for a communication station operable pursuant to communication of data in a communication scheme that provides for mobile allocation index offset. A detector is configured to detect a message delivered to the communication station. The message includes a bit map representative of a communication resource allocation. A controller is adapted to receive an indication of detection made by the detector. The controller is configured to control operation of the communication station responsive to detections made by the detector.

With these and other aspects in mind, reference is first made to FIG. 1 that illustrates a communication system, shown generally at 10, in which an embodiment of the present invention is operable. The communication system, in its exemplary implementation, forms a data radio communication system that operates in general conformity with the operating specification of a GSM/GPRS/EDGE (Global System for Mobile communications/General Packet Radio Service/Enhanced Data for GSM Evolution) communication scheme. In other implementations, the communication system is analogously representative of communication systems operable pursuant to other communication schemes. Accordingly, while the following description shall describe exemplary operation of the communication system with respect to its exemplary implementation, the teachings of the present invention are analogously applicable for implementation in other types of communication systems.

The communication system 10 is a multi-user communication system of which a set of communication stations, communication station 12 and communication station 14, are shown in FIG. 1. The communication station 12 is representative of a network station, formed of elements of a network part of the communication system. The communication system 12 shall, at times, be referred to herein as a network station 12. The communication station 14 is representative of a mobile station, and the communication station 14 shall, at times, herein be referred to as a mobile station 14. Either of the communication stations 12 and 14 is capable of generating and communicating EDGE data pursuant to performance of an EDGE data service. Operation shall be described with respect to communication of data in a down-link direction, that is, from the network station to the mobile station. Operation in an uplink direction, i.e., from the mobile station to the network station is analogously carried out.

A communication station 14' is also shown in FIG. 1. The communication station 14' represents another mobile station that is capable of communicating EDGE data with the network station 12. Separate point-to-point communication sessions as well as multicast communications in which, e.g., data is communicated by the network station to both the mobile stations 14 and 14' are provided.

Amongst the protocols set forth in the EDGE/GPRS/GSM operating specification are definitions of an EDGE channel structure. The EDGE channel structure is a TDMA (Time Division Multiple Access) scheme in which groups of eight time slots form a frame. Communication resource allocations are made by allocating time slots within a frame to communicate data during the allocated time slot or time slots. A maximum transmission rate of 59.2 kb/s per time slot is presently provided in a promulgation of the operating specification. When a communication service is to be performed, communication resources, i.e., time slots within frames define upon the carriers available for communication, are allocated for the communication of the EDGE data.

As each frame includes eight time slots, at least theoretically, all eight time slots of the frame can be allocated to a single communication session, i.e., for the communication of data between a set of communication stations, such as the communication stations 12 and 14, to perform a communication service. A maximum, theoretical transmission rate of 473.6 kb/s (8* 59.2 kb/s=473.6 kb/s) is available per frame.

In actual practice, however, allocation of all, or many, of the time slots per frame on a single carrier is unachievable. Various operating requirements of the EDGE/GPRS/GSM system require that a mobile station make various measurements during its operation. Measurements must be made, e.g., upon signals broadcast in cells adjacent to the cell in which the mobile station is positioned. The operating specifications TS 45.008 [5] and TS 45.002 [2], Annex B specify and define certain of the measurements. Time slots are also required to be allocated to perform other data and traffic services. Competition for the communication resources limits the availability of time slots, particularly contiguous time slots that are available to be allocated to effectuate a communication service.

For example, if there is a sixty percent probability of availability of a single time slot for assignment, the statistical probability of six contiguous time slots on a single carrier, i.e., a single mobile allocation index offset, within a frame being available is only 4.67 percent. The probability of all eight contiguous time slots of a frame on a single carrier being available drops to 1.68 percent. Even if limitations due to the need of a mobile station to make measurements is disregarded, there is, therefore, a statistically small likelihood that multiple, contiguous time slots would be available on a single carrier for allocation to communicate data pursuant to a particular EDGE communication service.

Contiguous time slots, or at least other additional time slots, are sometimes available on other radio carriers. By permitting the allocation of time slots across a plurality of radio carriers for the communication of data pursuant to a single communication session, an increased data throughput rate is achievable. When communication resources are allocated across a plurality of carriers, however, the communication stations that are parties to a communication session must be operable in manners to successfully communicate the data. All of the communication stations that are parties to the communication of the data must, therefore, have knowledge of the communication resource allocations made across the plurality of radio carriers. Pursuant to operation of an embodiment of the present invention, a manner is provided by which to make notification of the communication resource allocations across the radio carriers so that the communication stations that are parties to a communication session are notified of the communication resource allocation.

The communication stations 12 and 14 are functionally represented in FIG. 1, formed of functional elements that are implementable in any desired manner. Additionally, the functions performed by the various functional elements need not necessarily be positioned together at a common physical entity but, instead, can be distributed across several physical entities. The elements shown to form portions of the network station 12, e.g., need not be positioned at a single physical entity but rather can be distributed across several physical entities, such as, for instance, across a base station controller and a base transceiver station of the network.

The transmit chain portion of the network station is represented in FIG. 1 and is here shown to include a radio protocol stack 18 to which user application data is applied by way of the line 22. The application data is for communication to one or more mobile stations pursuant to one or more EDGE communication sessions. The radio protocol stack includes various logical layers including a radio resource management (RRM) layer. The network station also includes a baseband element 24 to which data is provided, here indicated by way of the lines 26. The baseband element performs various baseband operations, such as baseband processing, modulation, and channel coding.

The network station also includes a radio element 28. The data, once operated upon by the baseband element, is provided to the radio element, here indicated by way of the lines 32. The radio element is formed, at least functionally, of radio frequency transceiver front ends 34. N radio transceivers are shown in FIG. 1. Each of the radio transceivers is coupled to an antenna transducer 36. The transducers transduce the data into electromagnetic form for communication to one or more mobile stations 14.

The network station 12, pursuant to an embodiment of the present invention, also includes a multi-carrier radio resource control logic element 42. The element 42 is functionally coupled to the radio protocol stack 18, here indicated by way of the lines 44 and 46. The logic element is also coupled to the baseband element 24, here indicated by way of the lines 48. And, the logic element is further coupled to the radio element 28, here indicated by way of the lines 52. The logic element performs various functions and, in the exemplary implementation, is embodied at a radio resource management logical layer.

The logic element is here shown to include an analyzer 54, a resource allocator 56, a bit map constructor 60, and a temporary flow set identifier generator 62. The functions performed by the parts of the logic element 42 are carried out in any desired manner, such as, for example, by algorithms executable by processing circuitry.

The analyzer 54 receives indications of the data that is to be communicated by the network station to a mobile station pursuant to performance of a communication service during a communication session. In a multicast service, the data is communicated to a group of mobile stations. The indication of the characteristic includes, e.g., the amount of data that is to be communicated, within what period of time the data must be communicated, or additional indicia that, when analyzed by the analyzer, permits the communication requirements to communicate the data to be analyzed appropriately. Indications of the results of the analysis made by the analyzer 54 are provided to the resource allocator 56.

The resource allocator 56, responsive to the results of the analysis performed by the analyzer, allocates communication resources across a plurality of radio carriers or mobile allocation index offsets. In the exemplary implementation, a mobile allocation index offset and a time slot pair is provided for each of the allocations made by the allocator. Resources are signable on available time slots on different ones of the plurality of radio carriers or otherwise associated with the mobile allocation index offsets. The number of radio carriers that are available across which allocations can be made is dependent upon various factors, including the capabilities of the communication stations that are to be parties of the communication of the data. That is to say, for an allocation to be permitted, the communication stations must be capable of communicating at the frequency of the associated radio carrier. Allocations are further dependent upon additional factors, e.g., resource availability, the indications of which are also applied to the radio resource control logic 42.

The resource allocator 56 generates, or causes to be generated, control messages that are provided to the radio protocol stack, the baseband element, and the RF element to control their operation responsive to the allocation of resources made by the allocator.

An indication of the allocated resources is provided to a matrix representer 58. The matrix representer operates to represent the resources allocated for the communication of the data in matrix form. And, the matrix representation, once formed, is provided to the bit map constructor 60. The bit map constructor 60 operates to construct an assignment bit map of values corresponding to, or otherwise representative of, the matrix representation of the allocated communication resources. And, once constructed, the assignment bit map is provided to an RLC (Radio Link Control) header part message generator 62. The message generator 62 operates to generate at least portions of the RLC header part to include a header extension that includes the assignment bit map constructed by the bit map constructor. The header part generated by the message generator is used to form the header part of an RLC block that is communicated by the network station 12. The header part is combined with a payload part containing payload data provided by the baseband element. The RLC block formation is performed at any of the functional elements, such as the baseband element, the logic element, or the RF element of the network station.

In the exemplary implementation, the header part generated by the message generator 62 generates a radio link control protocol header that is formatted in conformity with the format provided for an RLC header set forth in the aforementioned operating specification. The header part includes a value inserted in a length indicator of the header part to indicate whether a header extension is included as a part of the RLC block. If the RLC block is to include the assignment bit map, then the length indicator is populated with a value to indicate that the block includes the header extension. Otherwise, the length indicator is populated with a value to indicate that the block does not include the header extension.

Once the RLC data block, wheresoever created, is formed, the data block is provided to the RF element to be communicated therefrom over the radio air interface defined between the network station and the mobile station.

The elements of the mobile station shown in the figure form its receive chain portion. The receive chain portion operates analogous to, but reverse to that of, the corresponding parts of the transmit chain portion of the network station.

Here, the mobile station 14 is shown to include an antenna transducer 64, an RF element 66, a baseband element 68, and a radio protocol stack 74. The RF element includes a plurality of transceiver front ends 76 with different ones of the transceivers being operable at different carrier frequencies.

The mobile station includes a multi-carrier radio resource control logic element 78, also of an embodiment of the present invention. The element 78 includes a detector 82 and a controller 84. The radio resource control logic element is coupled, at least functionally, to the radio protocol stack, here indicated by way of the lines 86 and 88, to the baseband element 92, and to the RF transceiver front ends of the RF element by way of the lines 94.

The detector 82 operates to detect the RLC block, or at least portions of its header part, that is communicated to, and delivered at, the mobile station. The detector operates to detect the value populating the length indicator field of the header part. And, if the value populating the length indicator is of a value indicating that the block includes a header extension, the detector further detects the values populating the header extension. The values populating the header extension are values of the bit assignment map that identifies the communication resources to be allocated for the communication of the data. Thereby, through detection of the values of the header extension, the mobile station is notified of the allocated resources. Detections made by the detector are provided to the controller 84. The controller operates to control operation of the mobile station so that the mobile station receives, and operates upon, data of the block that is subsequently communicated. In one implementation, the allocated resources remain allocated for an entire block period, i.e., four TDMA frames. The controller controls operation, for instance, of various elements of the mobile station to ensure that the elements are operable at the proper times to receive the data communicated upon the different carriers.

Figure 2:
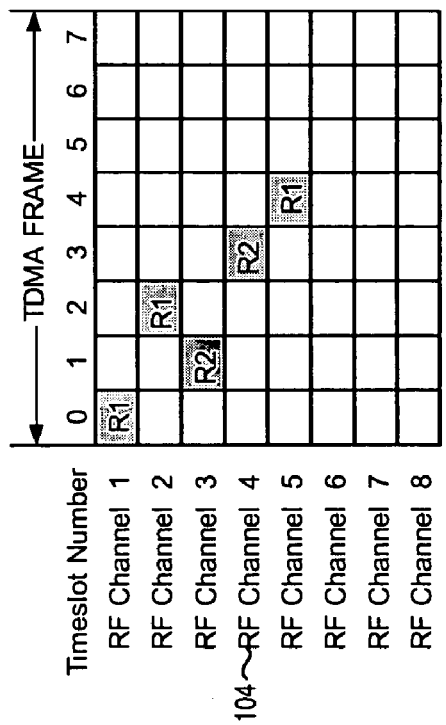
FIG. 2 illustrates a pictorial representation of exemplary operation of an embodiment of the present invention that forms part of the communication system shown in FIG. 1.
Figure 2:
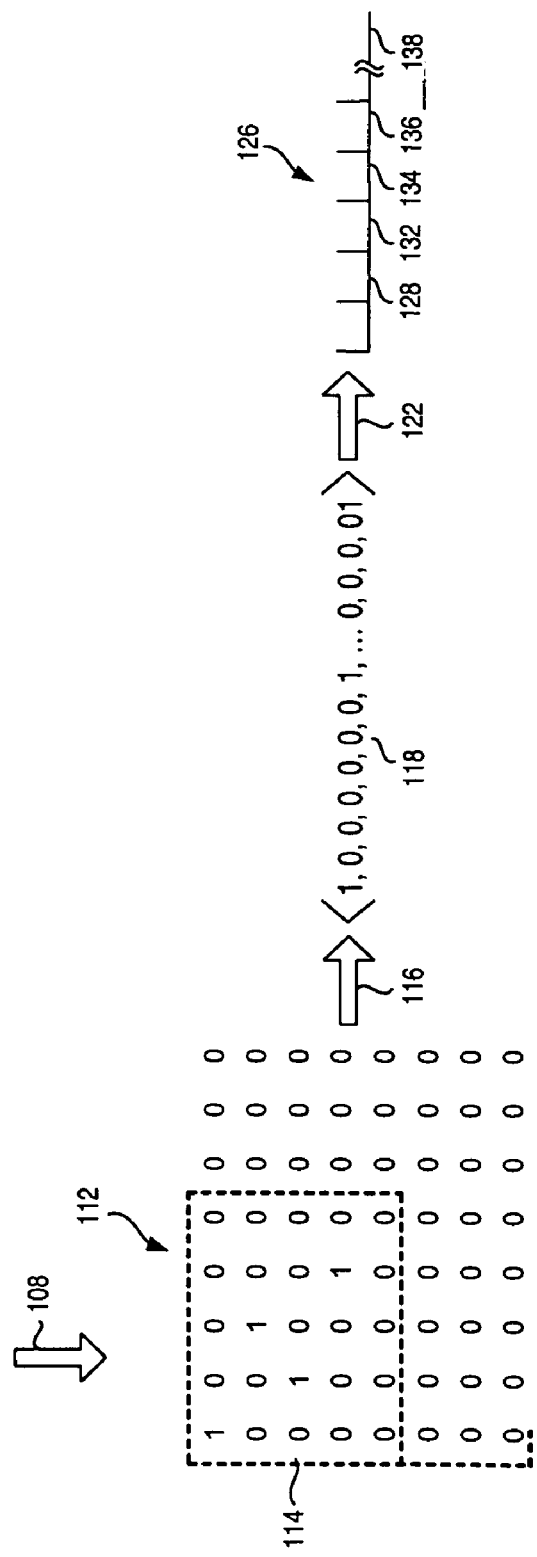

FIG. 2 illustrates a representation, shown generally at 98, that pictorially shows exemplary operation of the multi-carrier radio resource control logic element 42 that forms a portion of the communication system 10 shown in FIG. 1. An exemplary resource allocation is shown at the left-most side part (as shown) of the representation 98. A single TDMA frame is shown across a plurality of RF carriers 104, designated as RF channels 1-8. Channel allocations are indicated by R1 and R2 at five contiguous time slots on different ones of the carriers, channels 1-5.

Mapping, indicated by the arrow 108, is performed to create first, an 8×8 matrix 112. The matrix 112 shows a logical "1" when a resource allocation is made during a time slot upon a carrier and a logical "0" if no allocation is made during the corresponding time slot. A sub-matrix 114 is also shown in FIG. 2, here formed of rows and columns that include a logical "1" value. The sub-matrix 114 is representative generally of a manipulated matrix formable by the matrix representer as a result of matrix manipulation of the larger matrix 112. In other exemplary allocations of communication resources and other exemplary implementations, other types of matrix manipulations are performed to change the form or size of the matrix. Time slots and RF channel redundancies are removed in the exemplary example.

Indications of the matrix representation are provided, here indicated by way of the arrow 116, to the bit map constructor 60 (shown in FIG. 1) that operates to construct a bit map 118. The values of the bit map correspond to the values of the matrix representation 114. If the bit map is formed without using the matrix manipulation, that is, formed responsive to the matrix representation 112, the values of the bit map would, instead, correspond to the values of the larger matrix representation 112.

Thereafter, and as indicated by the arrow 122, the bit map is provided to the RLC header part message generator 62 (shown in FIG. 1). The header part message generator generates an RLC header part 126, here to include a length indication field 128 and, selectably, a header extension field 132. The length identification field is populated with a value to indicate whether the header extension field is formed. For instance, when the field 128 is populated with a logical "1" value, a header extension field is included, and the header extension field is populated with the values of the assignment bit map. And, e.g., if the length indication field is populated with a logical "0" value, then a header extension field is not included. The figure also shows fields 134 and 136, representative of additional information selectably included, identifying starting time indicia, either explicit or implicit, and duration indicia, respectively. And, a payload part 138 is further shown, the header and payload parts together form an RLC block. In another implementation, the duration of the communication resource allocation identified by the assignment bit map contained in the header extension is for a set period, e.g., a subsequent four TDMA frames, a single block period, or other period.

Reallocation of the communication resources is carried out, for instance, by sending, at selected intervals, an RLC block containing a header extension including updated or new bit map assignments.

Figure 3:
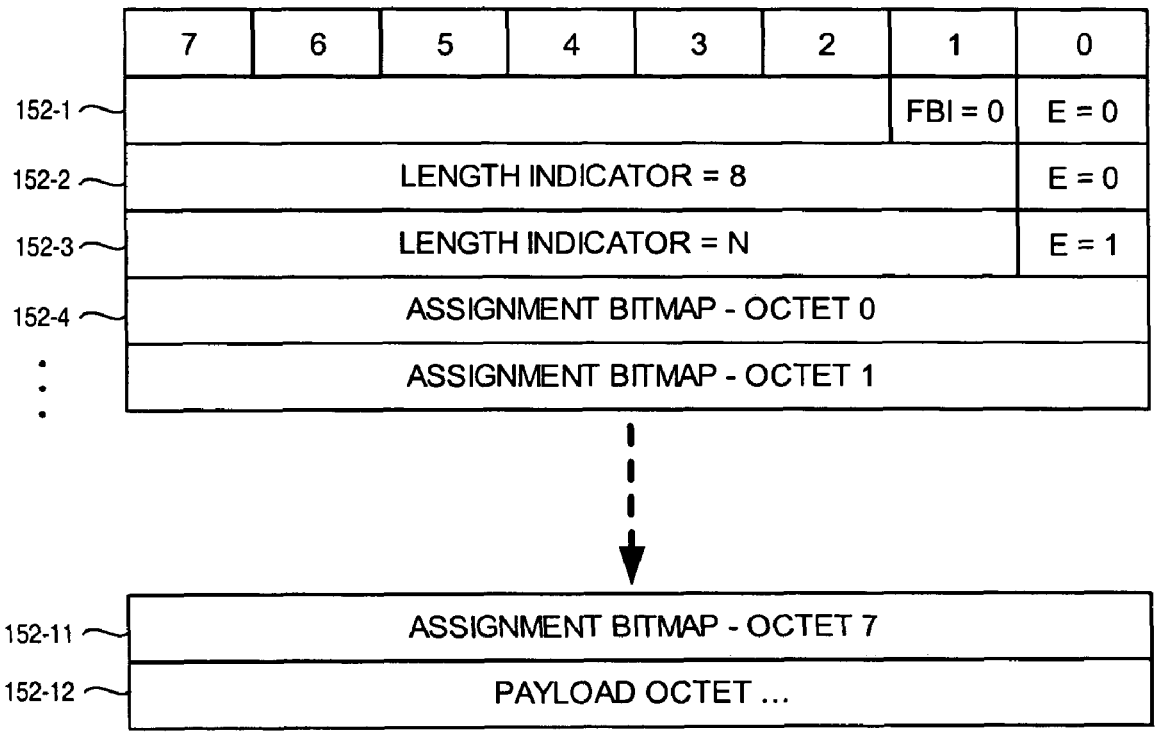
FIG. 3 illustrates a representation of an exemplary RLC block formed pursuant to operation of an embodiment of the present invention.

FIG. 3 illustrates a representation of an RLC data block, here shown at 148. Each row 152 of the data block includes eight bits. A presence of a non-zero value in the final bit of the length indicator field 152-2 and 152-3 indicates that an assignment bit map forms the first datum in the block, here indicated by the row 152-4 through row 152-11. The bit map here is formed of eight octets. And, the row 152-12 forms a payload octet of the payload portion of the data block.

Figure 4:
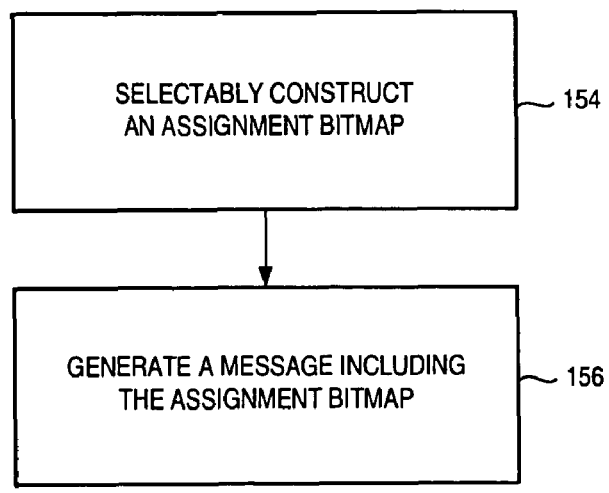
FIG. 4 illustrates a method flow diagram listing the method of operation of an embodiment of the present invention.

FIG. 4 illustrates a method flow diagram 153 listing the method of operation of an embodiment of the present invention. The method generates notification of a communication resource allocation allocable across a group of radio carriers.

First, and as indicated by the block 154, a first assignment bit map is selectably constructed responsive to a matrix representation of a communication resource allocation.

Then, and as indicated by the block 156, a message is generated that is formed of a first portion and a second portion. The first portion includes an indication whether the message includes a communication resource assignment and the second portion selectably includes the first assignment bit map.

Thereby, through the use of a header extension in an RLC block, and populating the header extension with an assignment bit map representative of communication resource allocation, a manner by which to notify a receiving station of the communication resource allocation is provided.

The previous descriptions are of preferred examples for implementing the invention, and the scope of the invention should not necessarily be limited by this description. The scope of the present invention is defined by the following claims.

What is claimed is:

1. Network apparatus for generating notification of a communication resource allocation allocable across a group of radio carriers and time slots, said apparatus comprising:
    a matrix representer configured to represent the communication resources allocated across at least one combination of radio carriers and time slots for communication of representation data in matrix form;
    a bit map constructor adapted to receive indication of allocation of a representation of communication resources in the matrix form, allocated for communication of data, said bit map constructor configured selectably to construct a first assignment bit map of values responsive to the indication of the allocation of the communication resources; and
    a message generator adapted to receive the first assignment bit map, said message generator configured to generate an RLC block having a header extension field populated with values of the first assignment bit map.

2. The apparatus of claim 1 wherein the RLC block generated by said message generator comprises a header part of which the header extension field forms a portion.

3. The apparatus of claim 2 wherein the RLC block further comprises a RLC (Radio Link Control) layer message.

4. The apparatus of claim 2 wherein the RLC block further comprises a RLC (Radio Link Control) data block.

5. The apparatus of claim 2 wherein the RLC block further comprises a payload, the payload including data for communication.

6. The apparatus of claim 5 wherein the RLC block further provides an indication when the RLC block contains the header extension field.

7. The apparatus of claim 2 wherein the header extension field generated by said message generator comprises part of a Radio Link Control, RLC, header.

8. The apparatus of claim 7 wherein the RLC header further includes an indication of a value to indicate whether the header extension field is populated with the values of the first assignment bit map.

9. The apparatus of claim 1 further comprising a detector adapted to receive an indication of a communication-station communication capability and wherein the indication of the allocation of the communication resources of which said bit map constructor is adapted to receive, is of values determined responsive, in part, to the communication-station communication capability.

10. The apparatus of claim 9 wherein the indication of the communication-station communication capability comprises a mobile station classmark.

11. The apparatus of claim 1 wherein the values populating the header extension field generated by said message generator defines assignment allocation of the communication resources for a selected time period.

12. The apparatus of claim 11 wherein the selected time period comprises a subsequent block period.

13. Apparatus for a mobile station operable pursuant to communication of data configured into at least a first data block across at least one combination of radio carriers and time slots to perform a radio communication service, said apparatus comprising:
    a detector configured to detect, once delivered to the mobile station, a first portion of an RLC block that includes an indication of whether the RLC block includes a communication resource assignment and configured to detect a second portion, of the RLC block, which forms a header extension field populated with values including a first assignment bit map formed from a matrix-form representation of allocation of communication resources across the at least one combination of radio carriers and time slots pursuant to the radio communication service; and a controller adapted to receive an indication of detection made by said detector, said controller configured to control operation of the mobile communication station responsive to the first assignment bit map of the second portion of RLC block and that identifies the assignment allocation of the communication resources across the at least one combination of radio carriers and time slots, if the first portion of the RLC block includes an indication that the RLC block includes a communication resource assignment.

14. The apparatus of claim 13 further comprising a communication capability indicia generator configured to generate one or more communication capability indicia, the message detected by said detector of values responsive, in part, to an earlier generated communication capability indicia.

15. A method for generating notification at a network station that operates pursuant to a data radio communication service in which communication resources are allocated of a communication resource assignment allocation across at least one combination of radio carriers and time slots to perform a radio communication service, said method comprising the operations of:

representing the communication resources allocated across the at least one combination of radio carriers and time slots for the communication of the data in matrix form;

constructing a first assignment bit map, responsive to the representation of the communication resources allocated in the matrix form, and an assignment allocation of the communication resources across the at least one combination of radio carriers and time slots to perform the radio communication service; and generating a header extension field that identifies the assignment allocation of the communication resources across the at least one combination of radio carriers and time slots, the header extension field formed of a first portion including an indication whether the message includes a communication resource assignment and, if so, of a second portion including the values of the first assignment bit map.

16. The method of claim 15 further comprising the operations of:

sending the header extension field, as a portion of an RLC Block, generated during said operation of generating to a remote station; and detecting the header extension field portion of the RLC block, once delivered to the remote station.

17. The method of claim 16 further comprising the operation of controlling operation of the remote station responsive to the values of the first assignment bit map when included in the second portion of the header extension field.

18. The method of claim 15 further comprising the initial operation of receiving a communication station capability indicia and wherein the allocation of the communication resources of which the first assignment bit map is representative is, in part, responsive to the communication station capability indicia.

19. The method of claim 15 wherein the header extension field generated during said operation of generating comprises a Radio Link Control, RLC, data block, and wherein the first portion and the second portion form at least a portion of a header part of the RLC data block.

20. The method of claim 19 wherein the second portion comprises a header part extension of the RLC data block.

* * * * *